United States Patent [19]

Dietzler

[11] Patent Number: 4,995,780
[45] Date of Patent: Feb. 26, 1991

[54] HANDLING METHOD FOR DELIVERING BALED SOLID WASTE TO A BALEFILL

[76] Inventor: Daniel P. Dietzler, 150 N. Montclair, Glen Ellyn, Ill. 60137

[21] Appl. No.: 408,144

[22] Filed: Sep. 15, 1989

[51] Int. Cl.⁵ .............................................. B65F 9/00
[52] U.S. Cl. .................................. 414/400; 414/373; 414/376; 414/111
[58] Field of Search ............... 414/398, 400, 799, 402, 414/385, 386, 111, 373, 376; 296/39.1; 298/22 R, 17 R, 1 R, 7

[56] References Cited

U.S. PATENT DOCUMENTS

| 4,091,943 | 5/1978 | Bay-Schmith | 414/555 |
| 4,186,845 | 2/1980 | Podd | 296/39.1 X |
| 4,256,434 | 3/1981 | Stodt et al. | 414/111 X |

FOREIGN PATENT DOCUMENTS

| 490078 | 1/1953 | Canada | 298/22 R |
| 457655 | 3/1975 | U.S.S.R. | 198/429 |
| 2068881 | 8/1981 | United Kingdom | 414/111 |

OTHER PUBLICATIONS

SWANCC publication; Mid-States Baler and Shear Systems publication; Summit Trailer Sales, Inc., publication; Waste Age Article from Sep. 1989; publication; and, TIVAR-88 Abrasion Plate dated Jul. 1987, publication (including eleven advertisement pages).

Primary Examiner—W. Grant Skaggs
Assistant Examiner—Keith L. Dixon
Attorney, Agent, or Firm—Lee, Mann, Smith, McWilliams & Sweeney

[57] ABSTRACT

A method for loading compacted solid waste refuse in the form of bales indexed two at a time for loading into a plastic-lined dump trailer. The dump trailer being covered and including a rear closure door for transporting the bales in a closed environment to a balefill. The method further includes tilting the dump trailer at a low slip angle to dump the bales a pair at a time smoothly sliding from the plastic-lined trailer to be picked by mechanical device for stacking in the balefill.

11 Claims, 2 Drawing Sheets

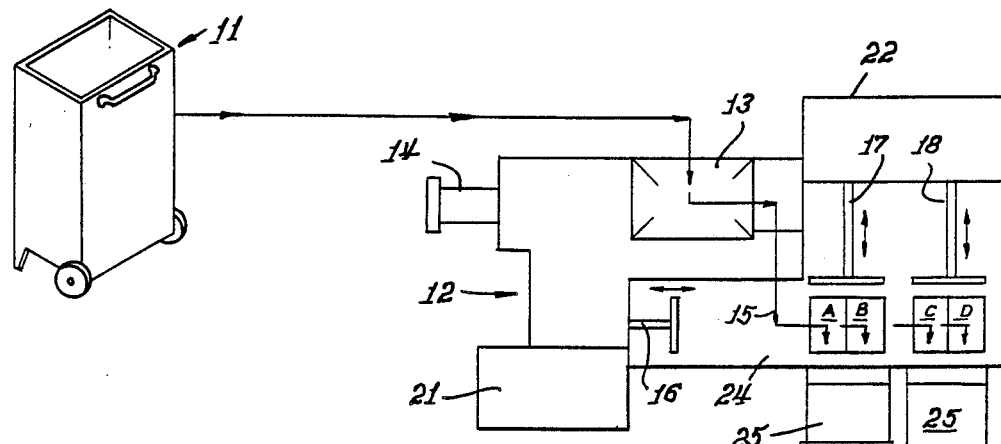
Fig. 1.
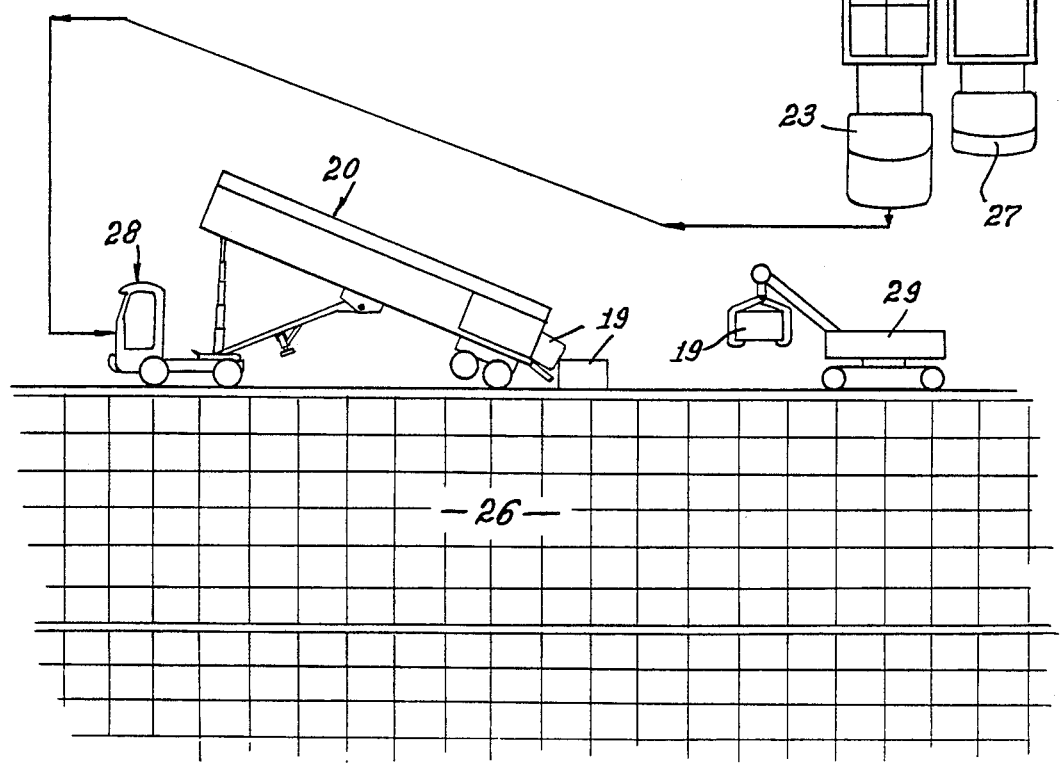

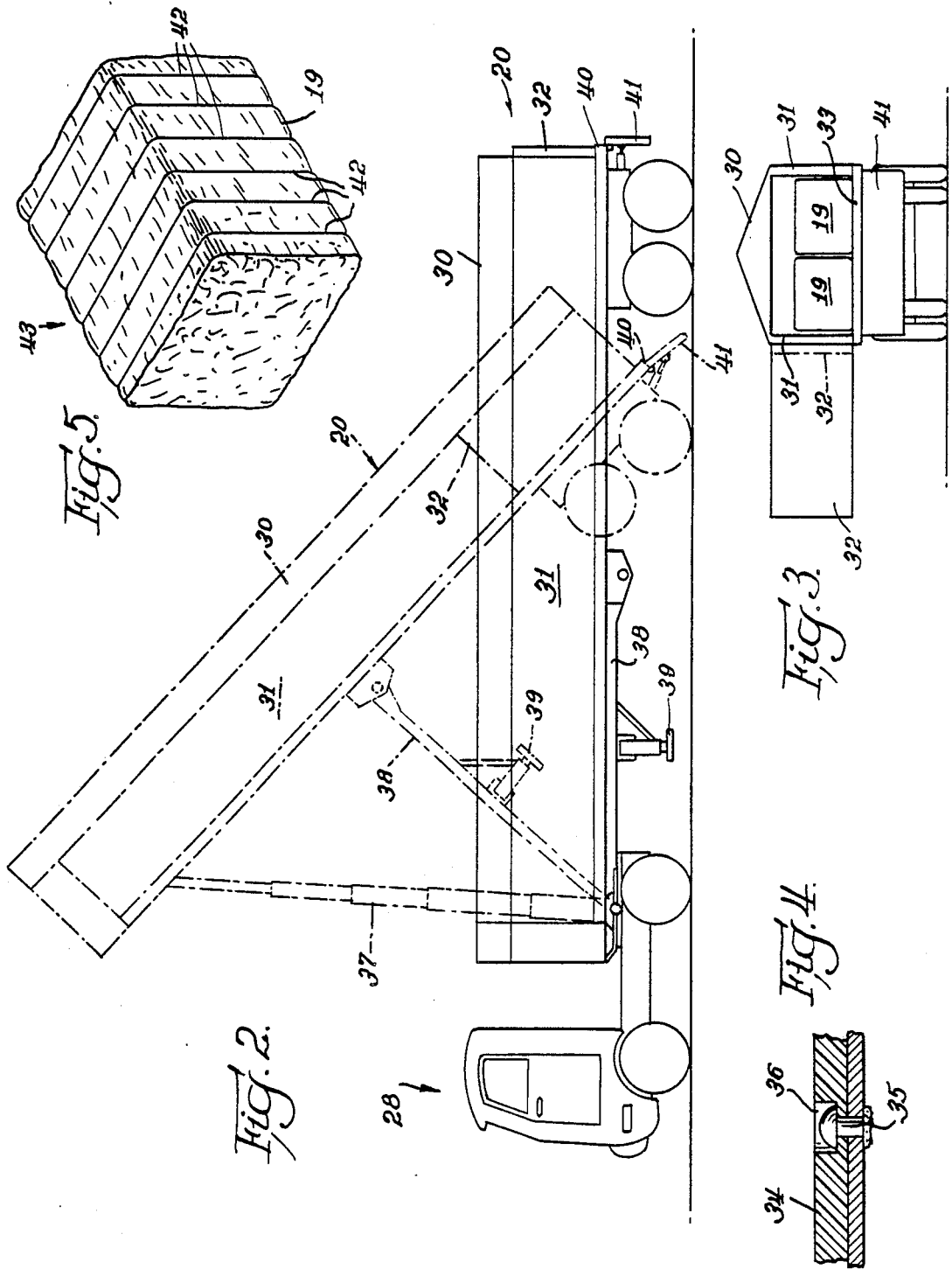

HANDLING METHOD FOR DELIVERING BALED SOLID WASTE TO A BALEFILL

BACKGROUND AND SUMMARY OF THE INVENTION

The invention generally relates to a method for handling compacted bales of solid waste facilitating the smooth transference of the bales from a baling device located at a transfer station to the balefill site. Particularly, the invention is directed toward the receiving and loading of compacted bales from the baler onto a trailer, maintaining the trailer in a closed condition, and carrying the bales in this closed condition to the point of unloading of the balefill, whereupon unloading and stacking at the balefill is efficiently accomplished. Even more specifically, the invention is directed toward loading and unloading bales comprised of municipal solid waste onto and from a closed dump trailer.

In order to meet society's needs for more orderly and efficient collection and disposal of municipal solid waste, acknowledging that conventional sanitary landfill sites are becoming less acceptable to the general public, and because those landfill sites that are acceptable tend to be further removed from the metropolitan areas where most of the municipal solid waste is generated, more transfer stations are being utilized. In addition because the landfill space is becoming so scarce more efficient utilization of that space via baling of the waste prior to diposal is being employed. Also in situations where transfer stations are not employed the possibility of loose papers and other refuse being scattered and carried away from the landfill by wind or birds has become an issue of concern to local residents. Requiring that the loose refuse be dumped inside an enclosed building and compacted into bales and conveyed in an enclosed trailer to the point of bale stacking is a solution to the blowing and scattering problem.

Baling involves the compressing of municipal solid waste into manageably-sized bales which can then be stacked in a very dense form and covered daily with soil. The so-called "balefill" is a type of sanitary landfill employing environmental safeguards to prevent contamination of surrounding ground water and release of gases. The balefill makes more economic and efficient use of the same amount of acreage as a sanitary landfill in which the waste is dumped and compacted with rollers and then covered with soil.

At the transfer stations, which may be remote to the balefill or at the balefill site, the collection vehicles which pick up the waste from the residences and other waste generation points discharge the loose waste inside a building. The loose waste is fed onto conveyors or into a hopper and them into a baler. Locating the transfer station close to the source of the waste generation enables the collection vehicles and crew to spend more time collecting waste and allows for more efficient transport of larger volumes of waste to the balefill via a transfer truck and trailer requiring only a single driver. In comparison, a typical collection crew consists of two workers and a vehicle of only two and one half times or less the net hauling capacity of a transfer trailer.

It is a related problem to provide for a transfer trailer that encloses the solid waste refuse and meets typical municipal sanitation and health code strictures for handling solid waste refuse. This must also be accomplished while cognizant of the problems of odor, litter, rodents and property value impacts surrounding the transfer station facilities and balefills.

Compacted bales of solid waste refuse should also be sized such that they are capable of being loaded onto and unloaded from a transfer trailer in a simple efficient fashion to avoid spillage, make transport easy, and facilitate the efficient stacking of the bales at the balefill site by means of providing generally uniform bale sizes.

It is a further goal of the industry to efficiently unload a covered trailer truck at the balefill site whereby the bales are quickly made ready for stacking in the balefill.

Although the use of log stackers or forklift vehicles of various types at balefill sites have been used to stack bales, the smooth unloading of the bales from the transfer trailers typically requires that the trailer beds be fitted with sleepers to create a space between the bottom bale and the trailer bed for insertion of a forklift time. Incorporation of sleepers into the trailer bed is not compatible with end loading of the trailers and thus necessitates side loading and unloading of the bales and manipulation of a removable cover or the trailer sides. These limitations result in operational problems and inefficiencies, particularly in wet and winter weather. Some previous attempts have sought to slide bales from a sea container onto the ground at a balefill, but a complete solution to the whole problem of providing a method of loading, transport and unloading has not been found. Smooth bed trailers are preferred for loading the bales from the end. A free-sliding arrangement would enable the bales to be slid into the trailers and slid out of the trailer without the need for removal of the trailer sides or cover, but only removal of the rear enclosure or gate which can be hinged.

Highway weight limitations also impact upon the handling of solid waste bales. Modern high density balers are generally capable of compressing municipal solid waste into bales weighing from about 3000 to 3500 pounds. Thus, it does not take very many bales to reach the allowable legal weight permit on Class 1 and Class 2 roadways. As a result, an efficient method to speed-up trailer turnaround time from the transfer station to the balefill, and back, is necessary.

In meeting the needs of communities and business for the collection, handling and disposal of solid waste, the present invention provides a method overcoming for foregoing problems and satisfying safety and health regulations as well.

The method envisions the handling of a bale size usually created by typical baling equipment having dimensions of roughly about 40 inches high, 61 inches long and 46 inches wide. At this size, pairs of bales may be placed side-by-side in trailer beds having standard outside widths of less than 102 inches. The 102 inch trailer width is the maximum width currently allowed in the United States without special permits. The invention is best suited for use with bales that are made by auto-loading baling devices that tie the bales with wire and incorporate a bale door, which devices achieve uniform, neat and manageable bales made from solid waste.

Another problem encountered in the use of dump trailers is frictional resistance along the bed of the trailer that may be exacerbated by the expanding nature of the compacted bales. Accordingly, it is further a goal of the invention to utilize a slick, lightweight lining for a trailer bed whereby to make the slip angle considerably less than the maximum tilt angle of a dump trailer—usually about 45°—and yet resist abrasion and impact from repeated sliding during loading and unloading of the bales. The lining facilitates the automatic dumping of the bales at the balefill site at a slip angle usually less than half of this full tilt angle even during weather conditions which might otherwise cause bales to freeze or stick together.

The inventive method further provides for the efficient loading of transfer trailers by taking advantage of automatic loading apparatus usually incorporated by manufacturers into their balers and having autoloading rams which may be used to include a step of indexing the bales in pairs for facilitating the direct loading onto the trailers. Preferably, aluminum frameless-type trailers are envisioned, which are approximately 40 feet long and offer a fully loaded 80,000 pound weight capacity for the tractor trailer combination that is spread over five or more axles pursuant to meeting allowable legal weight limits as established by the highway department in the locale where the trailers will be utilized. If the transfer station is located at the balefill, or in close proximity such that limitations are not imposed, the weight, length and width of the trailers may be increased. The auto-loading step provides for indexing pairs of compacted bales usually at either of two or more loading positions, whereby trailers may be arranged at each location. In that way, when one trailer is loaded and then driven away, an empty one may move into its place, while yet another empty trailer—located at another loading position—may be loaded. Thereby, continuous loading takes place by indexing the bales to a trailer loading location.

The dump trailer may further be provided with a fixed cover for fully covering the baled refuse. A rear swing-door of known design is used to close the end of the trailer. Therefore the method achieves the goal of providing for the transport of refuse in a fully closed condition to meet municipal codes and satisfy health and sanitary concerns. As an additional benefit, due to the end loading and unloading feature, there is no need to remove the trailer top or sides, which is a distinct improvement over the techniques commonly employed by the balefill operators.

At the balefill site, the tilting motion of the trailer drops the bales in sequential pairs onto the ground whereby they may be picked by a log stacker, forklift truck, or the like, for stacking at the balefill.

The auto-loaded bales are arranged side-by-side one bale deep in a sufficient number to meet legal weight limits for a trailer truck. The inventive method allows the transfer trailer to be loaded one bale deep and also arrange the bales at the minimum length on the trailer bed, up to maximum highway weight limits, whereby a shorter trailer may be used. The method is therefore directed toward high density baling systems where municipal solid waste may be compacted in densities of from about 44 to about 61 pounds per cubic foot. If the transfer station is located at the balefill, or such that a private road can be utilized, wider and more heavily loaded trailers may be employed.

In providing for an enclosed trailer environment, a cover made of lightweight aluminum, fiberglass, or other suitable weather resistant material, may be used. The cover can be fixedly attached to securely enclose the trailer. Access to the bales from the top is not necessary. One important benefit of the invention is permitting the use of a lightweight fixed trailer top, which overcomes many difficulties in the past with canvas-type covers or tarpaulins that are unwieldy, difficult to handle in wet and cold weather, and must be tied down during transit. The tarpaulin coverings also deteriorate through repeated use.

The autoloading or sliding of bales into the trailers from the rear requires that the trailer sides be rigid so as to prevent the bales from wandering or becoming canted inside the trailer. The invention satisfies this requirement in that the method envisions using trailer sides that are rigid and lined, yet the trailer top is lightweight and weatherproof.

In further achieving the goal of efficient handling of trailers at a transfer station, the method may optionally include coordinating up to three different type tractors for moving the trailer. In this regard, the usual highway-type tandem axle tractor may be provided to pull a trailer from the balefill to a remote transfer station site and disconnect, whereupon a smaller tractor, called a trailer spotter, may take the detached trailer and move it to the loading position at a baling device. This is optional. When loaded, the trailer spotter will take the trailer to a parking area and disconnect, whereupon a tandem axle tractor will again be attached to the trailer for transporting it to the balefill site. Alternatively, the highway-type tandem axle tractor may attach to the loaded trailer while it is mated to the baler, whereupon the tractor would pull forward, stop, close the tailgate and then proceed directly to the balefill for unloading. At the balefill site, the loaded trailer will be unloaded at the point of balefill filling, or at a nearby location it will be detached from the tandem axle tractor and a special heavy-duty all-terrain tractor vehicle, equipped with a heavy-duty suspension system, axles, tires, brakes and hydraulic pump system, will be attached for traversing the uneven ground usually found at a balefill. The all-terrain tractor will pull the trailer to the active face of the balefill and activate the hydraulic system of the dump trailer to tilt it and slide off the bales. In the meantime, the just-detached tandem axle tractor will hitch to an empty trailer at the balefill and return to the transfer station for another load of bales. A trailer thereby goes through this sequence repetitively.

BRIEF DESCRIPTION OF THE DRAWINGS

FIG. 1 is a schematic view of the path of municipal refuse from receipt at the point of generation, conveyance to a transfer station having a solid waste baling device, compacted, bound by wire and loaded onto transfer trailers, whereafter the bales are transported to a balefill to be unloaded and stacked in the balefill, all in accordance with the invention;

FIG. 2 is an elevational view of a stable frameless dump trailer for use as a transfer trailer hitched to an all-terrain tractor, and further showing the dump trailer hydraulically elevated to a tilt position;

FIG. 3 is an end view of the dump trailer as in FIG. 2 showing a barn-type rear door closure means in the open position and disclosing an end pair of bales enclosed therein by means of a roof-cover over the trailer;

FIG. 4 is a sectional view of the trailer wall showing the affixation of a plastic trailer lining offering constant lubricity and facilitating the clean and easy sliding of the bales when the dump trailer is tilted; and, FIG. 5 is a perspective view of a standard size bale formed of compacted solid municipal waste and wire banded, as would occur at known automatic baler devices;

DETAILED DESCRIPTION OF THE INVENTION

The invention will now be described in conjunction with the drawings, wherein like reference numerals throughout refer to the same elements.

FIG. 1 is a diagrammatic and partially schematic illustration of the inventive method whereby refuse is taken from, for example, the residential generator, transported to a baler, baled and transported to a balefill in very dense form for safe, underground, covered burial. Specifically, a curbside collection bin 11 will hold the contents of residential refuse which is to be accummulated in a refuse collection vehicle for transport to the transfer station. It is then, as shown by the arrows, taken by the collection vehicle to a baling device generally referenced at number 12. The baler 12 may include a conveyor means for taking the refuse to a hopper 13, where a sliding hydraulic ram apparatus 14 located in a chamber will consolidate the loose refuse and compact it in a series of strokes into a very dense baled form. Then the bale is ejected from the bale chamber by an intermittent stroke of a ram and wire tires are applied around the bales at intervals between the ejection strokes. Upon full ejection one bale is positioned at 15, whereat an indexing ram 16 moves the bale to a position A or C. The next bale is then compressed and moved to a position A or C, thereby moving the previous bale to position B or D respectively. Then a pair of hydraulic rams 17-18 will move the bales, generally denoted at 19, onto a trailer 20.

The baler 12 further includes a power unit 21 and a compression and delivery housing 22. The invention is particularly directed to baling devices that are located inside an enclosure in a modular series of baling devices, each module having an attendant conveyor, hopper, compression and delivery housing, and powering unit. The baling device, or devices are enclosed from the outside by an enclosing building structure, or the like, in order to confine the municipal waste indoors and away from surrounding streets, residences, businesses, parcels of land, etc. Accordingly, the invention is primarily directed toward an enclosed baling operation, where the baling device(s) is inside a structure.

Balers typically used in the industry are made by Harris Press and Shear, Inc., Mosley Machinery Company, Inc., Longemann Bros. Company, and Mid-States Baler and Shear Systems. These devices generally provide for the densifying of municipal solid waste in the range of from about 44 to 61 pounds per cubic foot. Minimum densities are usually required to be maintained in order to properly form the bale for handling, and for efficient storage in a balefill. These minimum densities are in the range of from about 42 to 44 pounds per cubic foot. The maximum achievable densities with solid waste are usually up to about 61 to 63 pounds per cubic foot. A baler particularly useful in the invention is one made by the aforesaid Harris Press and Shear. This device utilizes a bale door rather than making the sixth side of the confined compression chamber the side of a preceding bale—a commonly used procedure in other baling devices.

In conventional baling devices, an industry-wide standard bale size has not been chosen. It has been found to be particularly useful to provide for a bale that is about 61 inches long, 40 inches high and 46 inches wide, whereby the long width made be loaded lengthwise into a dump trailer and the bales arranged in pairs to provide an interior width just slightly less than the normal interior width of a dump trailer.

In densifying the solid waste refuse, the baler 12 will provide for a density in the said expected range of from about 44 to about 61 pounds per cubic foot, and therefore provide a bale weight in the range of about 3,000 to about 4,000 pounds. Preferably, the weight of about 3,500 pounds per bale would result in 14 bales having a combined weight of 49,000 pounds. This amount, plus the typical weight of a tandem axle trailer, shown at 23, of about 16,000 pounds, and the typical dump trailer 20, having a weight of about 14,000 pounds, will result in a combined loading weight of 79,000 pounds, which is slightly less than maximum weight limits on Class 1 and 2 highways.

While auto-loading baling system are known, the present invention provides for the step of indexing the bales 19 in pairs to be located at positions A-D in pairs A-B or C-D for jointly urging pairs of bales onto the trailers 20. Locations A-D are positions on a loading dock or platform means 24, and having optional loading extension means 25, whereat the bales are indexed and then urged by rams 17 or 18 to the trailers 20.

In the disclosed embodiment, a type of trailer well suited for highway use is a dump trailer having a 40-foot trailer body, an outside width of 102 inches, and an inside width of about 94 inches, including the provision of a plastic liner as hereinafter described. The trailer 20 in preferred form would further be of the type that is a stable, frameless dump trailer with a low center of gravity and capable of tilting to an angle of up to 45 degrees.

With further reference to FIG. 1, a loaded trailer 20 is shown being pulled by the tandem axle highway tractor 23 for transport, indicated by the arrows, to a balefill 26. The second trailer 20, shown at the loading platform extension 25, is drawn by a different type tractor known as a trailer spotter, generally referenced at numeral 27. The trailer spotter type device 27 would be utilized at the baling transfer station for moving trailers from parking areas to the loading dock, where after loading the tandem axle tractor 23 may be hitched to take the loaded trailer to the balefill 26. At the balefill, as shown in FIG. 1, an all-terrain tractor 28 may be hitched to the loaded trailer 20 for maneuvering and hauling the dump trailer 20 across the balefill to the active face or wall of the balefill that is being stacked at that particular moment. The all-terrain tractor 28 is a known off-the-road type construction tractor having specially equipped heavy duty suspension, axles, tires, brakes, and a hydraulic pump system for tilting the dump trailer 20.

The next step of the inventive process provides for the tilting of the trailer 20, as illustrated in FIG. 1, whereby, due to the plastic lining, the bales will begin to slip at a relatively low slip angle of about 20 to 22 degrees reached by the inclining dump trailer 20. Thereafter, a log stacker or the like, generally shown at 29, may grab the bales 19, usually one at a time, for stacking in the balefill.

The inventive method also provides for solutions to problems generating industry-wide concern with respect to properly covering the trailer to enclose the refuse, efficient unloading, and uniform handling of bales for effective stacking at the balefill. The present invention provides for the step of loading bales of a uniform size onto dump trailers with fixed covers, wherein the combined width of a pair of bales is slightly less than the plastic lined inside dimension of the covered trailer to achieve optimal packing and requisite enclosure.

With more particular reference to trailer 20, and in conjunction with the FIGS. 2–4, it will be seen that the dump trailer 20 includes a cover 30, which in the preferred embodiment is a sloped-roof design, and is fixed to the trailer sidewalls 31 at the top edges thereof. The cover 30 therefore need not be removed or reattached as in standard prior art techniques using tarpaulins and the like. The cover 30 may be made of aluminum, plastic, fiberglass, or the like. It also need not be peaked, although this would facilitate effectively handling rain and melting snow. It is important to keep the bales 19 in an enclosed environment when transporting them because of sanitary concerns.

As shown in FIG. 3, a rear barn-type door 32 of the trailer 20, is shown swung out to disclose the interior of the trailer 20 and a pair of bales 19 resting on the bottom wall, or trailer bed, 33 of the trailer 20. In FIG. 2, the door 32 is shown fastened, in a known way, to the outside of the sidewall 31 when the dump trailer 20 is in the tilted position, depicted by the phantom lines.

The easy sliding of the bales 19 from the dump trailer 20 is important to the present solution to the problems found in the industry with respect to providing for unloading a trailer that is enclosed all around except for the discharge opening at the door 32. The sure sliding of high density bales 19 will significantly advance the art by efficiently and quickly removing bales from a trailer for stacking in the balefill. Speed and sanitary handling are both achieved. This solution is firstly accomplished by loading bales from the baler 12 into a plastic lined dump trailer 20. As shown in the sectional view of FIG. 4—a representative section of either the sidewalls 31, or bottom wall 33—a plastic liner 34 is fastened by means of driving a drive rivet 35 into a countersunk hole 36 of the sidewall 31 or trailer bed 33. The lining 34 desirably has a slippery, plastic surface of constant lubricity which allows even sticky materials often found in solid waste refuse to clean out and slide easily. Such plastic further must provide for a surface that will not allow loads to freeze to it, which loads might be stored for long periods during low temperatures, even overnight. One particular plastic that is well suited for the present invention is a super abrasion resistant, ultra-high molecular weight polymer sold under the trademark TIVAR by Menasha Corporation, Fort Wayne, IN. The material is a high molecular weight polyethylene that has built-in lubricity, eliminating the need for other materials or liquids for slipperiness. The material weighs ⅛ as much as steel and can be machined for fitting trailer beds by means of standard hand tools.

The plastic liner 34 achieves a threshold bale slip angle of about 20 to 22 degrees, as previously noted with regard to FIG. 1, upon the activation of the hydraulic system to extend a heavy duty tube 37 and pivotally hinged draft arms 38 to tilt the dump trailer 20 and slide the bales therefrom. Conventional support legs 39 allow for supporting the trailer 20 without being hitched to a tractor, as would be understood.

As the tilt angle increases, a rear edge 40 of the dump trailer 20 moves in a direction toward the all-terrain tractor 28 in order to ultimately slide out all of the pairs of bales, one pair at a time, onto the ground as shown in FIG. 1. In the disclosed embodiment, a 40-foot long trailer 20 is provided whereby the rear edge 40 moves from a starting position of about five feet from the ground to about two feet off the ground at a full 45 degree tilt angle. To facilitate the easy sliding of the bales 19 from the bed 33, an optional short extension flap 41 may be hingedly and mechanically/hydraulically attached to the trailer bed 33, generally adjacent the rear edge 40, for help in guiding the bales 19 onto the ground.

As will be seen in FIG. 3, the height of the bales 19, which in the preferred embodiment is 40 inches, provide for a spacing below the top edge of the sidewall 31. Standard trailers provide a depth of about up to 48 inches, whereby the bales 19 will have roughly eight inches of space below the tops of the sidewalls 31. Thus, the bales 19 have sufficient room to slide and tip from the trailer bed 33. As shown in FIG. 2, in the down position, the optional rear flap 40 may be mechanically, such as by hydraulic means, moved to a vertical position substantially parallel to the closed rear door 32.

To further reduce weight, dump trailers of the frameless variety, that are usually made of aluminum for lengths over 34 feet, are well suited to this invention in order to assuredly meet highway weight limitations. The utilization of seven pairs of bales 19, having the "standard" dimensions and properties explained above, has been found to be optimal given the usual densities achieved by typical baling devices for solid waste refuse and in packing trailers with the long dimension of the bales lengthwise of the trailers. Thereby, the maximum amount of one-deep loading may be achieved with the shortest length of bales.

The inventive method loads the bales only one deep within the trailer 20 in order to facilitate easy loading and simple "slide-out" at the balefill site.

One dump trailer 20 will be cycled through the stages of loading at the baler 12, transport by the tandem axle trailer 23, positioning at the balefill 26 by means of an all-terrain tractor 28, and the dumping of the bales for collection by the log stacker 29. Specifically, an empty trailer 20 will be drawn back to a parking location at the transfer station near the baler 12 by means of a tandem axle tractor 23, but the tandem axle tractor 23 itself may back the trailer 20 directly to the loading platform means 24 and extension 25. Thereat, the tandem axle trailer 23 can be disconnected, and a trailer spotter 27 attached to the trailer 20 for moving the trailer 20 about the baling transfer station facility. When loaded, the trailer spotter 27 may be unhitched and a tandem axle tractor 23 rehitched to the trailer for cartage to the balefill 26. At the balefill, the all-terrain tractor 28 may replace the tandem axle tractor 23 for maneuvering the trailer 20 through the balefill site and over oftentimes uneven and rough ground for pulling the trailer 20 to the active face of the balefill. However, either the all-terrain tractor could be eliminated or the spotter could be eliminated; or the highway tractor could be eliminated, depending on the location of the transfer station and the operator's preferences.

With reference to FIG. 5, an isometric view of a bale 19 is shown wherein a plurality of wire ties 42 are shown strapping around the top, bottom and sides. The use of known baling devices, such as baler 12, most effectively denisify solid municipal waste by compressing in the direction of the arrow 43 which achieves the densities of from about 44 to about 61 pounds per cubic foot, and at an optimal size generally to be about 40 inches high by 46 inches wide by 61 inches long as set forth above. Varying these dimensions by more than about three or four inches each, may not achieve the proper bale dimensions that would allow municipal solid waste to be packaged in a neat bundle which does not fall apart and yet may be wire tied for handling and loading one bale deep on the trailer.

While a preferred embodiment illustrating the implementation of the inventive method has been disclosed, it will be understood that the invention is not specifically limited thereto and has a wider range of equivalents.

What is claimed is:

1. A method for handling solid waste in a compacted bale form comprising the steps of:
   ejecting a compacted solid waste bale having a length and a width in the lengthwise direction from the bale door of a solid waste baler on to a platform means;
   operating a ram means and pushing the bale widthwise and transversely along the platform means to the ejecting direction to one of at least two index positions;
   ejecting a compacted second solid waste bale having a length and a width in the lengthwise direction from the bale door of the solid waste baler;
   operating said ram means and pushing the second bale widthwise and transversely to the ejecting direction to the position of the first said bale;
   displacing said first bale in said transverse direction for a distance substantially equal to the width of the second bale whereby said first and second bales form a pair of bales to be loaded;
   operating a second ram means and pushing the pair of bales in the lengthwise direction and transversely to the first mentioned transverse direction into a covered plastic-lined trailer;
   ejecting and pushing additional pairs of bales into the trailer until a desired load is reached;
   closing door means of said trailer and maintaining said bales in a closed condition inside the trailer;
   transporting said bales to a balefill site;
   opening the door means of said trailer;
   tilting the trailer to dump said bales in pairs at said balefill and advancing a rear edge of said trailer in a direction away from a first pair of dumped bales until all said pairs are dumped therefrom; and, picking the bales one at a time by mechanical means and stacking said bales at the balefill site.

2. The method for handling solid waste as claimed in claim 1, wherein the step of pushing a pair of bales into a trailer comprises operating either of two hydraulic rams forming said second hydraulic ram means.

3. The method for handling solid waste as claimed in claim 1, wherein the step of tilting the trailer means to dump said bales comprises sliding said bales over a rear flap means extending generally from the advancing rear edge of said trailer.

4. The method for handling solid waste as claimed in claim 1, further comprising the steps of pushing a subsequent pair of bales transversely of said ejecting direction into another of said at least two index positions, operating said second ram means having a ram at said other position and pushing said subsequent pair onto a trailer.

5. A method for handling and transporting compacted solid waste bales from a transfer station comprising the steps of:
   pushing bales transversely from the ejecting direction of a baler in pairs alternatingly to two index positions on a loading dock means and spaced from said baler ejecting path whereby subsequent pairs are pushed alternatingly to said two index positions;
   alternately operating a pair of ram means in a direction generally parallel to said ejecting direction to push alternate pairs into dump trailer means arranged at either said index positions at said loading dock means;
   pushing subsequently indexed alternate pairs of bales into said dump trailer means to reach a desired loading amount;
   enclosing said bales within the dump trailer means;
   transporting said bales within the dump trailer means to a balefill;
   opening said dump trailer means to disclose said bales;
   tilting said dump trailer means to dump the bales a pair at a time from each said dump trailer means; and, stacking said bales at said balefill.

6. The method for handling and transporting compacted solid waste bales as claimed in claim 5, wherein the steps of pushing bales into a dump trailer means comprises pushing the bales into a plastic-lined dump trailer.

7. The method for handling and transporting compacted solid waste bales as set forth in claim 5, wherein the step of enclosing said bales comprises closing a rear door of a dump trailer means having a fixed cover thereover.

8. The method for handling and transporting compacted solid waste bales as claimed in claim 5, wherein the step of tilting said dump trailer means comprises dumping the bales over a rear edge flap means extending from the trailer bed for directing the bales to be dumped onto the ground.

9. A method for receiving, transporting and delivering compacted refuse in the form of bales comprising the steps of:
   moving a first dump trailer to a loading platform means spaced from a baling device;
   opening rear door means of said trailer to expose a plastic-lined interior of said covered first dump trailer;
   ejecting bales in one direction from a baler;
   pushing two bales one at a time transversely to the ejecting direction to a first location on the loading platform means and forming an indexed first pair of bales for loading into the trailer;
   pushing said pair from the first location in a direction generally parallel to the ejecting direction and into said first dump trailer;
   pushing subsequent pairs from the baler to the first location and into the first dump trailer until a desired weight loading is achieved;
   pushing subsequently ejected pairs of bales one at a time to form indexed pairs at a second location on the opening platform means;
   moving a second dump trailer to the platform means spaced from the baler and at said indexed second bale pair location;
   opening rear door means of said second dump trailer to expose a plastic-lined interior of said second dump trailer;
   pushing indexed pairs of bales from said second location into the second dump trailer until a desired weight limit is achieved;
   after reaching a desired weight loading at either said dump trailer, closing the rear door means thereof;
   transporting a dump trailer to a balefill site;
   reopening the rear door means thereof;
   tilting a dump trailer to an angle;

sliding pairs of bales from a dump trailer onto the ground; and, lifting bales from the ground to be stacked at a balefill site.

10. The method as in claim 9, wherein the step of indexing baled solid waste refuse in pairs of bales further comprises indexing the bales with the smallest dimension in the vertical direction, the longest dimension arranged parallel to the longitudinal axis of a dump trailer and an intermediate width dimension arranged transversely of said dump trailer and extending from side-wall to sidewall thereof, the combined width dimension of said pairs of bales being slightly less than the width of said dump trailer.

11. The method as in claim 9, wherein the step of sliding said pairs of bales initiates at a tilt angle of about 20 to 22 degrees.

* * * * *